A. A. GEWONT.
PNEUMATIC TOOL DRIVING DEVICE.
APPLICATION FILED SEPT. 27, 1917.

1,286,992.  Patented Dec. 10, 1918.

Witness
J. W. Patee

Inventor
Andrew A. Gewont,
By Pagelsen & Spencer
Attorneys

UNITED STATES PATENT OFFICE.

ANDREW A. GEWONT, OF DETROIT, MICHIGAN.

PNEUMATIC TOOL-DRIVING DEVICE.

1,286,992.  Specification of Letters Patent.  Patented Dec. 10, 1918.

Application filed September 27, 1917. Serial No. 193,448.

*To all whom it may concern:*

Be it known that I, ANDREW A. GEWONT, a citizen of the United States, and residing at Detroit, in the county of Wayne and State of Michigan, have invented a new and Improved Pneumatic Tool-Driving Device, of which the following is a specification.

The present invention has reference to a pneumatic tool driving device whereby a drill cutter or the like may rotate constantly in a given direction. The device is intended primarily for driving the fine high speed tools employed by sculptors, but it is recognized that it may be employed in various arts.

Speaking generally, the invention consists in a device in which the air is delivered to a series of buckets that travel in an annular cylinder, and is afterward exhausted interiorly of the rotor of which the buckets are a part, and longitudinally of the shaft thereof, to clear the surface of the work of chips and dust. More specifically, the invention consists in a rotor comprising two main disks and a series of buckets mounted on the periphery thereof, together with a series of grooves in the face of one of the disks and a passage or passages in the rotor shaft whereby the exhaust air is directed along the tool. The invention also consists in a disk-like rotor channeled in its periphery to communicate with and form an exhaust passage for a plurality of air receiving buckets, together with a passage or passages connected to the channel and inclosed by the rotor for directing the exhaust air in proximity to the bearings for one side of the latter and finally delivering it at the working point. The invention further consists in the details of construction shown, described and claimed.

Figure 1:
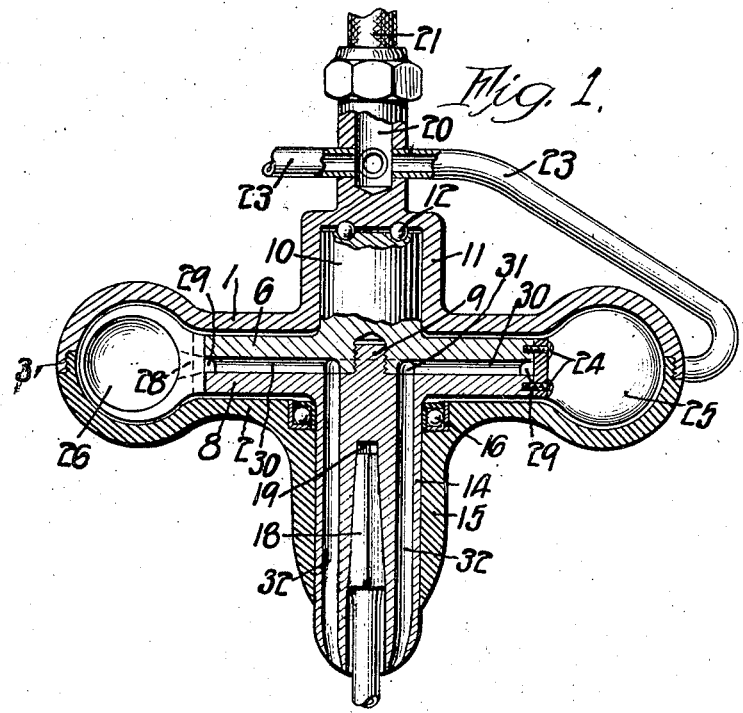
Figure 2:
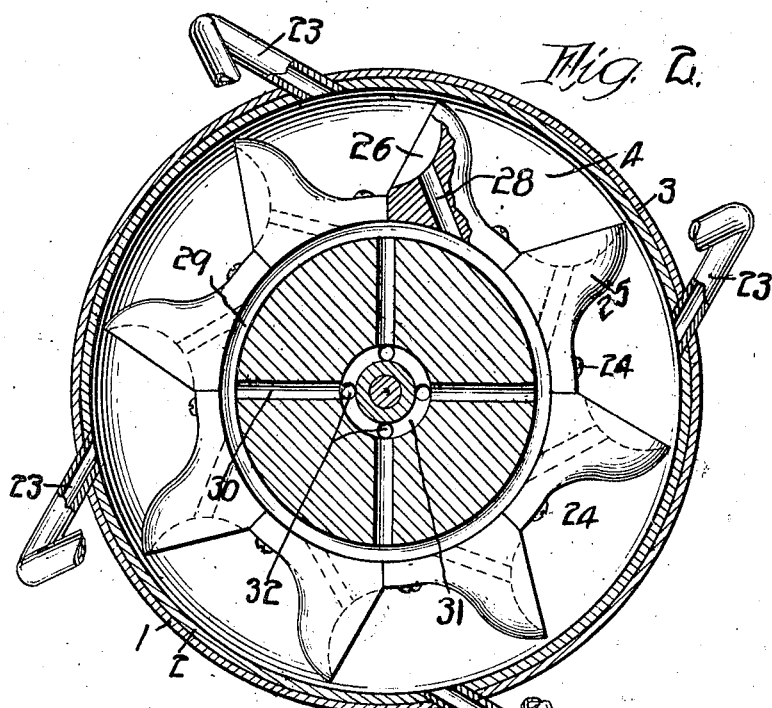

In the drawings, Figure 1 is a central longitudinal section showing a preferred embodiment of the invention, and Fig. 2 is a central transverse section corresponding to Fig. 1.

In the embodiment shown, the casing is formed of two somewhat similar sections 1 and 2 which are preferably threaded into one another at 3 although they may be connected by other means. These sections together form a chamber including an annular cylindrical portion 4 and are spaced apart interiorly of the latter to afford clearance for a rotor which is built up of the sections 6 and 8. Any suitable means may be employed for connecting the rotor sections; as shown, the section 6 is tapped and threaded to receive a threaded stud or pintle 9 on the section 8. The shaft 10 of the section 6 bears in the closed hub 11 with which the casing section 1 is provided, a ball bearing 12 of the thrust type being interposed; and the shaft 14 of the section 8 is received in and projects from the perforated hub 15 of the casing section 2. A ball bearing 16 is preferably interposed between the shaft 14 and the section 2, and a similar bearing (not shown), may, of course, be employed for the shaft 10. For the purpose of receiving the shank 18 of a suitable tool, the shaft 14 is provided with a chuck socket 19.

The hub 11 is extended to form a chamber 20 to which compressed air is supplied through a hose 21; from the chamber 20 the air is delivered through the pipes 23 (four being shown) to a series of points in the periphery of the cylinder 4, the ends of the pipes being inclined forwardly at the points where they enter the cylinder so that the air may be directed in jets substantially tangentially of the rotor. Attached to the periphery of the rotor by means of screws 24 are a series of buckets that conform closely to the inner wall of the cylinder and are recessed on their rear sides as indicated at 26, to receive the impact of the air jets. At the base of the depressions, the buckets are provided with passages 28 that lead to an annular groove 29 formed in the face of the rotor section 6, preferably at the outer edge thereof. This groove in turn communicates by means of a series of radial grooves 30 with an annular groove 31 located within the extended confines of the shaft 14, and the latter is bored through to provide a series of passages 32 whereby the air exhausted from the buckets is directed along the tool to blow chips or borings away from the work. The air passages also have an additional function in that they tend to keep the bearings for the shaft 14 cool.

The entire device is compact and may be readily manufactured in the form shown. I am aware, however, that the actual details may be varied considerably, and do not, therefore, wish to be limited except as indicated by the subjoined claims.

I claim:

1. A tool driving device comprising a casing forming an annular cylinder, a rotor mounted in the casing, said rotor including two disk-like sections rigidly connected together and substantially in a plane perpendicular to the axis about which the rotor turns, the rotor also including buckets secured to the sections along the periphery thereof and conforming to the cylinder, means for supplying fluid under pressure to the cylinder to drive the rotor, said disk-like sections together including passages formed substantially in the common face thereof for exhausting the fluid from the cylinder inwardly toward the axis about which the rotor turns.

2. A tool driving device comprising a casing forming an annular cylinder, a rotor mounted in the casing, said rotor including two sections rigidly connected together, each of the sections having a disk-like body portion and a shaft, the shafts being alined, and a series of buckets fixed to the body portions along the periphery thereof and conforming to the cylinder, means for directing compressed working fluid against the buckets to cause the rotor to turn, the rotor having a series of passages formed substantially in the meeting plane of the disk-like body portions, and one of the shafts having a passage extending longitudinally thereof in communication with the first named passages, whereby working fluid exhausted from the buckets is discharged substantially along the axis of the shaft.

3. A tool driving device comprising a casing forming an annular cylinder, a rotor mounted in the casing, a series of buckets attached to the periphery of the rotor and conforming to the cylinder, said rotor having an annular passage near the buckets, said rotor also having another passage extending substantially radially inwardly from the first named passage to a point near the axis of the rotor and thereafter extending substantially parallel to said axis, whereby working fluid delivered to the buckets may be exhausted substantially parallel to said axis.

4. A motor comprising a casing forming an annular cylinder, a rotor mounted therein, said rotor having peripheral blades, means for supplying fluid under pressure to the cylinder to drive the rotor, said rotor including a shaft having a longitudinal passage therein, a bearing supported by the casing and surrounding the shaft, said motor including an additional passage communicating with the longitudinal passage for exhausting the working fluid from the cylinder and cooling the shaft.

5. A motor comprising a casing forming an annular cylinder, a rotor mounted therein, said rotor having peripheral blades, means for supplying fluid under pressure to the cylinder to drive the rotor, said rotor including a shaft having a longitudinal passage therein, a bearing supported by the casing and surrounding the shaft, a passage in the rotor leading inwardly from the outer surface thereof and communicating with the longitudinal passage for exhausting the working fluid from the cylinder and cooling the shaft.

ANDREW A. GEWONT.